United States Patent [19]
Woodruff et al.

[11] Patent Number: 5,501,103
[45] Date of Patent: Mar. 26, 1996

[54] TWO-PORT ELECTROMAGNETIC DRIVE FOR A DOUBLE-ENDED TUNING FORK

[75] Inventors: James R. Woodruff, Redmond; Michael J. Robinson, Mukilteo, both of Wash.

[73] Assignee: AlliedSignal Inc., Morristown, N.J.

[21] Appl. No.: 198,228

[22] Filed: Feb. 15, 1994

[51] Int. Cl.$^6$ .................................................. G01P 15/08
[52] U.S. Cl. ........................ 73/514.29; 73/862.59
[58] Field of Search .......................... 73/862.59, 704, 73/DIG. 1, 778, 651, 514.15, 514.29, 504.12, 504.16; 331/65, 156, 163

[56] References Cited

U.S. PATENT DOCUMENTS

| | | | |
|---|---|---|---|
| 4,535,638 | 8/1985 | EerNisse | 73/862.59 |
| 4,851,080 | 7/1989 | Howe | 73/517 AV |
| 4,912,990 | 4/1990 | Norling | 73/862.59 |
| 5,233,874 | 8/1993 | Putty | 73/517 AV |

*Primary Examiner*—Hezron E. Williams
*Assistant Examiner*—Christine K. Oda

[57] ABSTRACT

An electromagnetically-excited silicon micromachined vibrating beam accelerometer includes a proof mass or pendulum attached to an outer casing by way of a pair of flexures defining a hinge axis HA. A double-ended tuning fork (DETF) is connected between the proof mass and the casing along an axis generally perpendicular to the hinge axis (HA) defining a sensitive axis SA such that forces applied along the hinge axis HA will cause the DETF to go into either compression or tension. Electromagnetic excitation causes the vibrating beams to vibrate at a resonant frequency when the proof mass is at rest. In response to a force along the sensitive axis SA, the vibrating beams go into either tension or compression resulting in a change in the resonant frequency which, in turn, is used as a measure of the force. The excitation includes a magnetic field B, applied in a direction generally perpendicular to the plane of the DETF and perpendicular to the sensitive axis SA. In order to eliminate the effects of variations in the resistance path of the vibrating beams due to either manufacturing tolerances and temperature, the DETF in accordance with the present invention is formed as a dual-port device with separate conducting paths for the drive circuit and the pick-off circuit. By providing separate conducting paths, the effects of changes in the resistance path of the drive circuit have little effect on the overall performance of the oscillator. Since the beams are separated, the DETFs are configured to provide sufficient mechanical coupling of the beams forming the DETF.

14 Claims, 4 Drawing Sheets

PRIOR ART

TWO-PORT ELECTROMAGNETIC DRIVE FOR A DOUBLE-ENDED TUNING FORK

CROSS REFERENCE TO RELATED APPLICATIONS

This patent application is related to U.S. patent application Ser. No. 072, 903, filed Jun. 7, 1993 entitled, VIBRATING BEAM FORCE TRANSDUCER WITH AUTOMATIC ADJUSTMENT OF ITS ELECTROMAGNETIC DRIVE, by Michael J. Robinson and James R. Woodruff now U.S. Pat. No. 5,339,698, issued on Aug. 23, 1994.

BACKGROUND OF THE INVENTION

1. Field of the Invention

The present invention relates to a vibrating beam accelerometer and, more particularly, to a vibrating beam accelerometer which includes an electromagnetically excited double-ended tuning fork (DETF) formed with separate conducting paths for the drive circuit and pick-off circuit to minimize the problems associated with vibrating beam accelerometers formed with a single conducting path resulting from variations of the resistance path due to manufacturing tolerances and temperature changes.

2. Description of the Prior Art

Vibrating beam accelerometers are generally known in the art. An example of a known vibrating beam accelerometer is shown in FIG. 1. Such known vibrating beam accelerometers normally include a pendulum or proof mass 20, connected to a casing 22 by way of a pair of flexures 24 to enable the pendulum 20 to rotate about a hinge axis HA, defined by the flexures 24. A double-ended tuning fork (DETF) 26, which includes two vibrating beams or tines 28 and 30, is connected between the casing 22 and the pendulum 20, perpendicular to the hinge axis HA to define a sensitive axis SA.

Excitation is applied to the DETF 26 to cause the vibrating beams 28, 30 to vibrate at a resonant frequency when the pendulum 20 is at rest. Forces applied along the sensitive axis SA cause the vibrating beams 28, 30 to go into either tension or compression which changes the resonant frequency of vibration of the beams 28, 30. This change in frequency, in turn, is used to measure the force applied along the sensitive axis SA.

Various types of excitation are known to force the vibrating beams 28, 30 to vibrate, such as electromagnetic, electrostatic, and thermal excitation. The type of excitation depends on the particular materials used for construction. For example, crystalline quartz DETFs are excited according to the piezoelectric property of the quartz. DETFs made from silicon are normally micromachined and are excited by other means, such as electrostatically or electromagnetically.

FIG. 1 illustrates a silicon micromachined vibrating beam accelerometer that includes a double-ended tuning fork that is adapted to be excited electromagnetically. In such an embodiment, the vibrating beams 28, 30 are electrically connected at one end 32 while electrodes or wire bond pads 33 and 34 are formed at the opposing ends 36 defining a conducting path. In such an embodiment, a conductive material, such as gold, is applied to the vibrating beams 28, 30 as well as the wire bond pads 33, 34 to enable electric current to flow between the wire bond pads 33 and 34 through the vibrating beams 28, 30 as shown. An externally generated magnetic field B is applied in a direction generally perpendicular to the plane of the DETF 26. The magnetic field B reacts with the currents in the vibrating beams 28 and 30 to cause a force on the beams 28 and 30. If the electrical current applied to the beams 28, 30 is alternating current (AC), the beams 28, 30 will vibrate. The vibration of the beams 28, 30 causes a voltage to be generated across the wire bond pads 33, 34 as a result of the magnetic field. This voltage, known as the pickoff voltage, in turn, is conditioned and fed back to the source of the excitation current to form an oscillator. A more detailed description of magnetic excitation is disclosed in U.S. Pat. No. 4,912,990, incorporated herein by reference.

A drive voltage is also available at the same wire bond pads 33 and 34. This drive voltage results from the excitation current flowing across the resistance of the DETF; a relatively large voltage drop relative to the pickoff voltage. In order to form an oscillator circuit, the drive voltage needs to be separated from the pickoff voltage, available across the same wire bond pads. It is known to use a bridge circuit to separate the voltages. For example, the voltage at the wire bond pads is known to be amplified to a practical level for regulation to provide an output signal and limited by an amplitude limiter, the output of which is connected to a resistor in series with the DETF. The DETF, in turn, is known to be connected between that resistor and ground to form a voltage divider. In order to separate the pickoff voltage from the drive voltage, the voltage from the voltage limiter is known to be supplied to another voltage divider that is proportioned so that the output of the two dividers is approximately the same except for the pickoff voltage. The two dividers are used to form a bridge, the output of which is the pickoff voltage.

The problem with such a configuration is that a single conducting path is used for both the drive voltage and the pickoff voltage. Thus, any variation of the resistance in such a single current path, as well as the components discussed above connected to the beams resulting from manufacturing tolerances and changes in temperature, will result in an oscillator that works very poorly, if at all.

SUMMARY

It is an object of the present invention to solve various problems associated with the prior art.

It is yet another object of the present invention to provide an electromagnetically-excited micromachined silicon vibrating beam accelerometer which minimizes the problems associated with resistance variations in the conducting path of the vibrating beams due to manufacturing tolerances and temperature.

Briefly, the present invention relates to an electromagnetically-excited silicon micromachined vibrating beam accelerometer which includes a proof mass or pendulum attached to an outer casing by way of a pair of flexures defining a hinge axis HA. A double-ended tuning fork (DETF) is connected between the proof mass and the casing along an axis, generally perpendicular to the hinge axis (HA) defining a sensitive axis SA, such that forces applied along the sensitive axis SA will cause the DETF to go into either compression or tension. Electromagnetic excitation causes the vibrating beams to vibrate at a resonant frequency. In response to a force along the sensitive axis SA, the vibrating beams go into either tension or compression resulting in a change in the resonant frequency which, in turn, is used as a measure of the force. The excitation includes a magnetic field B, applied in a direction generally perpendicular to the plane of the DETF and parallel in the configuration shown to the sensitive axis SA. In order to compensate for variations in the resistance path of the vibrating beams due to either manufacturing tolerances or temperature, the DETF in accordance with the present invention is formed as a dual-port device with separate conducting paths for the drive circuit and the pick-off circuit. By providing separate conducting paths, changes in the resistance of the drive circuit have a relatively lesser effect on the performance of the oscillator. In addition, since the beams are separated, the DETFs are configured to provide sufficient mechanical coupling of the beams forming the DETF.

BRIEF DESCRIPTION OF THE DRAWING

These and other objects of the present invention will be readily understood with reference to the following detailed description and attached drawing, wherein.

DETAILED DESCRIPTION OF THE PREFERRED EMBODIMENT

Figure 1:
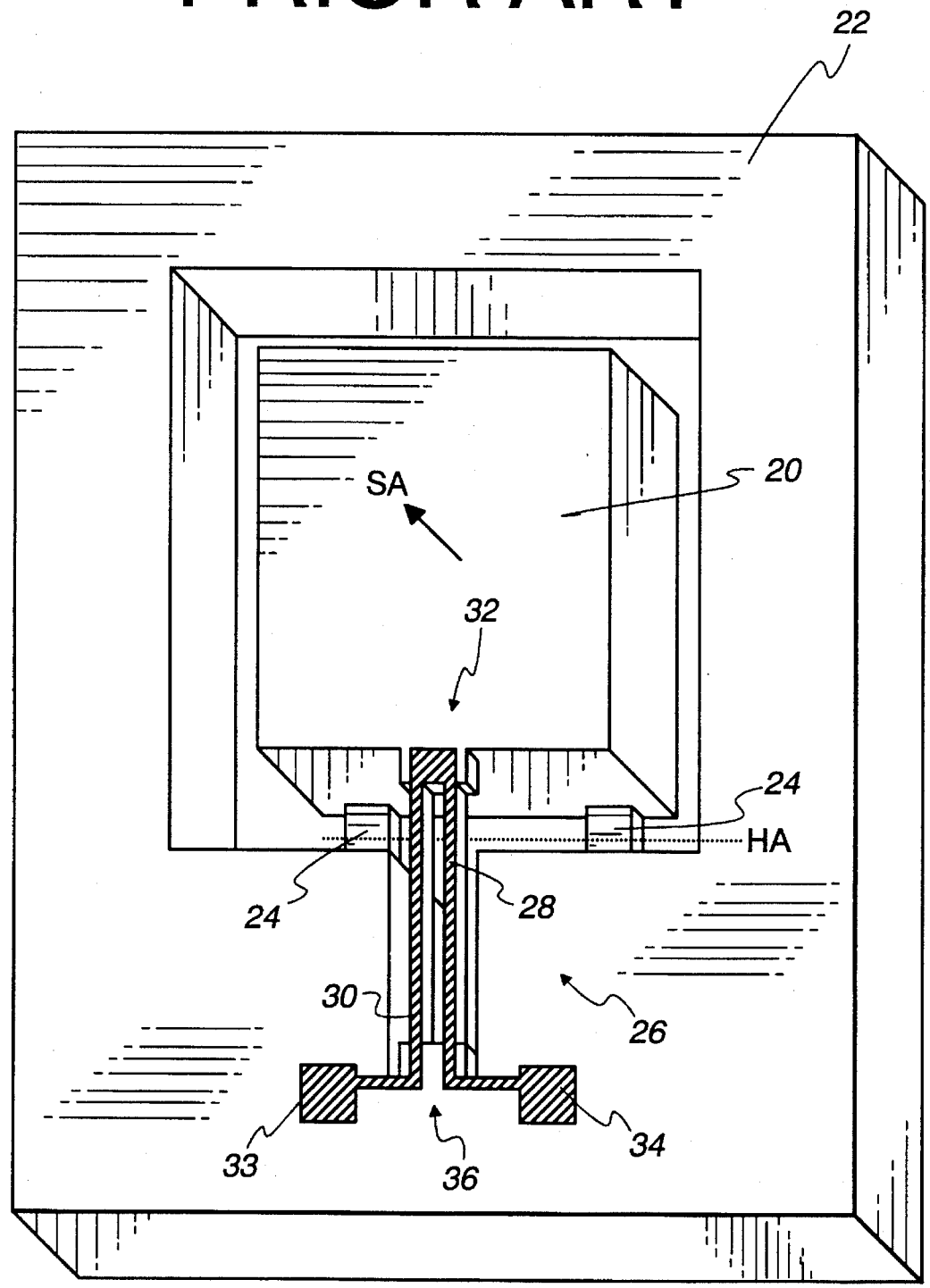
FIG. 1 is a perspective drawing of a known vibrating beam accelerometer.

The present invention relates to a silicon micromachined accelerometer that is adapted to be electromagnetically excited. Such electromagnetically excited accelerometers are known to include a double-ended tuning fork (DETF) which includes a pair of tines or vibrating beams generally parallel and spaced apart. In known electromagnetically excited accelerometers, the vibrating beams are electrically connected together at one end to form a closed current path for an alternating current (AC) that is applied to the beams for excitation. By applying a constant magnetic field such that the lines of flux are generally perpendicular to the plane of the DETF, forces are generated which cause the beams to vibrate towards and away from each other as a result of the interaction of the constant magnetic field with the magnetic field generated by the flowing electrical current. Thus, with such a configuration as illustrated in FIG. 1, both beams or tines of the DETF are driven by the excitation circuit.

Due to the vibrating action of the beams or tines in the constant magnetic field, a pickoff voltage is generated at the free ends of the beams. This pickoff voltage is separated from a drive voltage resulting from the drive current flowing through the beam and then fed back in a positive feedback loop back to the source of the drive current to form an oscillator. Unfortunately, any variations in the resistance of the conducting path which includes both of the vibrating beams as well as any components connected in series with the DETF will cause variations in the pickoff voltage resulting in poor performance of the resulting oscillator.

Figure 2:
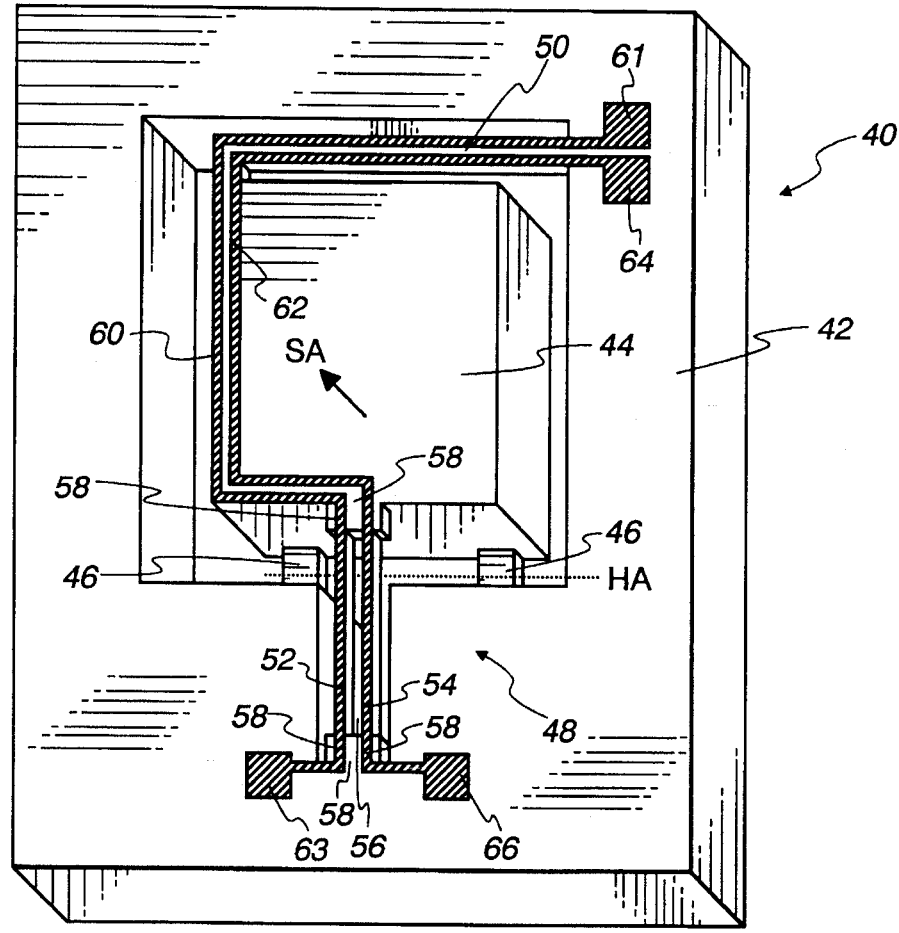
FIG. 2 is a perspective drawing of an electromagnetically-excited vibrating beam accelerometer having a pair of vibratory beams in accordance with the present invention.
Figure 3:
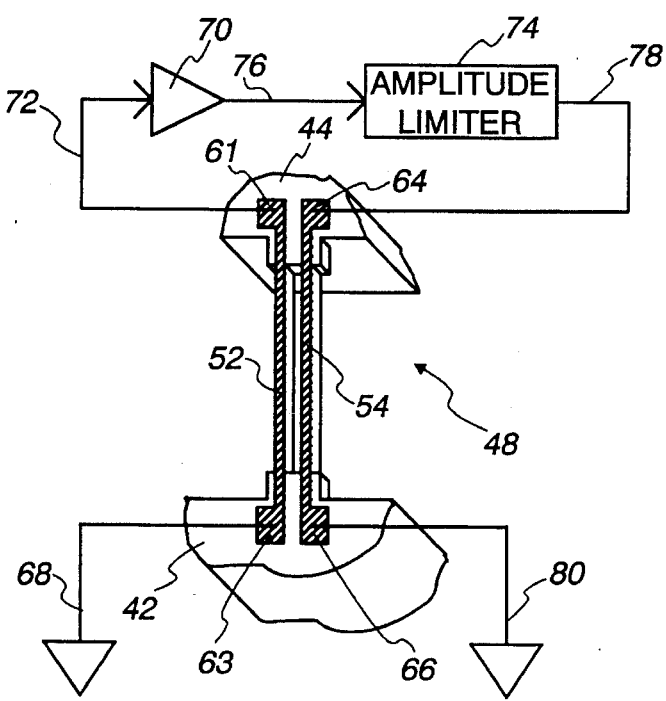
FIG. 3 is a simplified block diagram of an oscillator circuit incorporating the accelerometer illustrated in FIG. 2.
Figure 4:
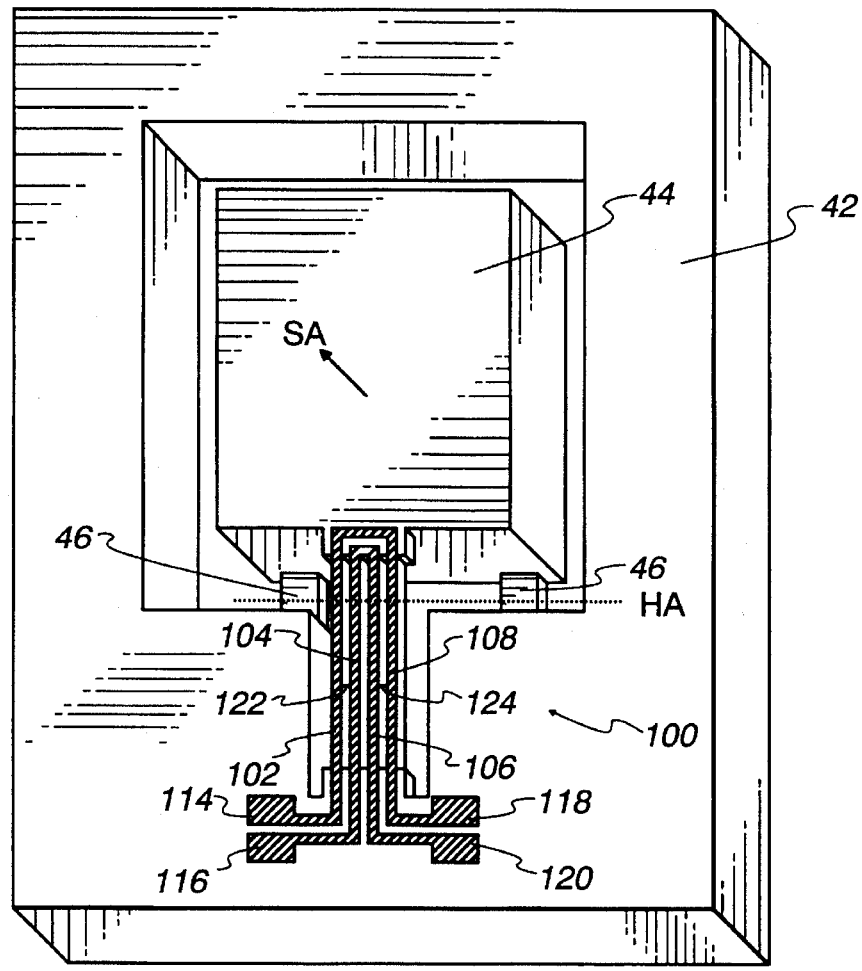
FIG. 4 is a perspective view of an alternate embodiment of an electromagnetically-excited vibrating beam accelerometer having four vibrating beams in accordance with the present invention.
Figure 5:
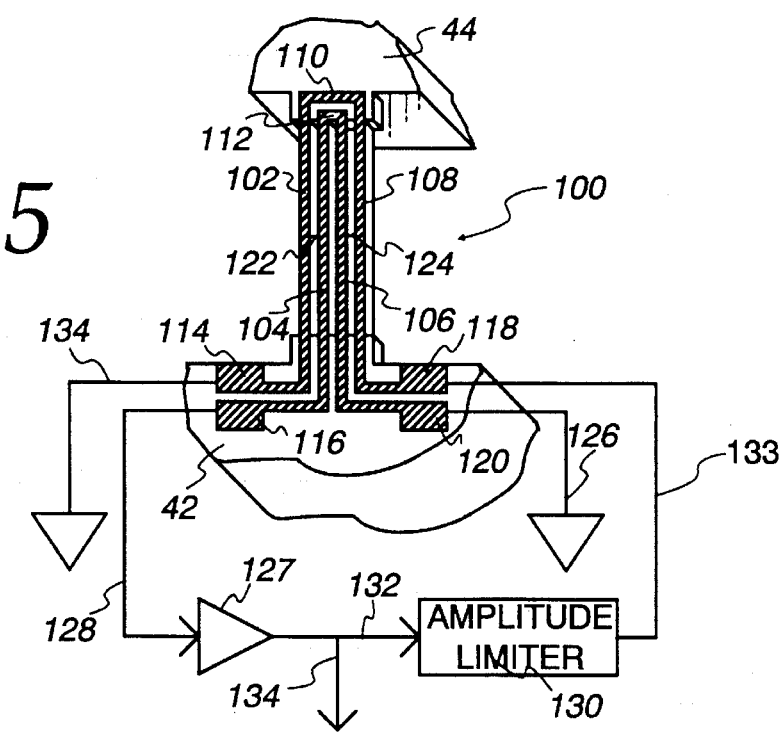
FIG. 5 is a simplified schematic diagram of an oscillator circuit formed with the vibrating beam accelerometer illustrated in FIG. 4.
Figure 6:
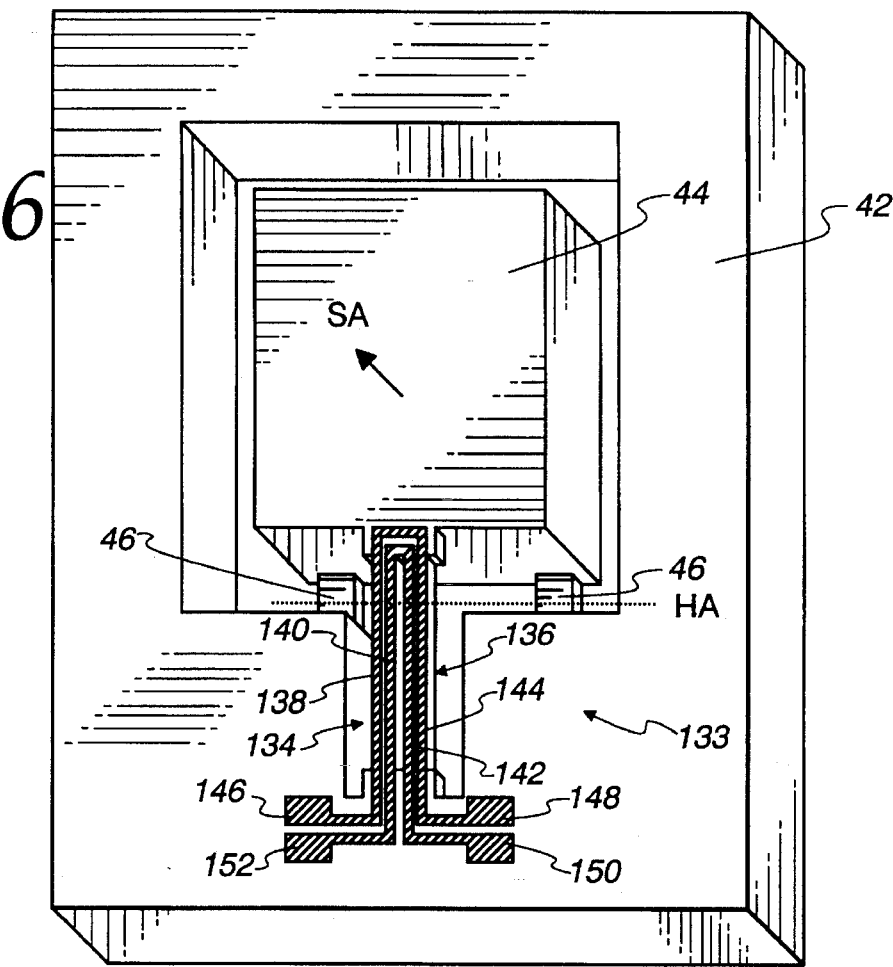
FIG. 6 is a perspective view of an alternate embodiment of the electromagnetically-excited vibrating beam accelerometer in accordance with the present invention formed with a pair of vibrating beams having multiple conducting paths per beam.
Figure 7:
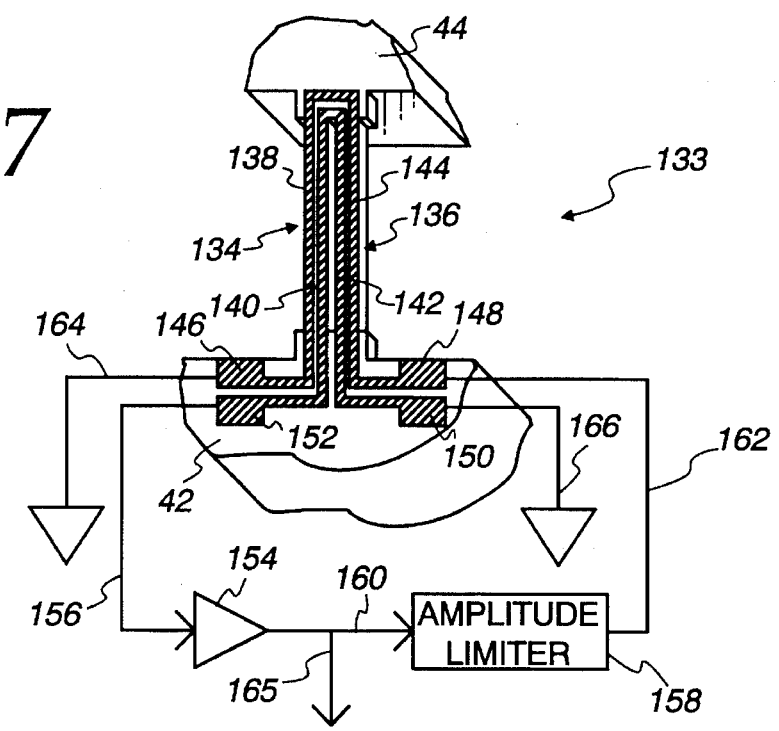
FIG. 7 is a simplified schematic diagram of an oscillator circuit formed with the vibrating beam accelerometer illustrated in FIG. 6.

The vibrating beam accelerometer in accordance with the present invention solves this problem by providing separate and electrically isolated conducting paths for the drive circuit and the pick-off circuit by configuring the DETF as a two-port device. Various embodiments of the invention are contemplated. In particular, FIGS. 2 and 3 represent an embodiment of the invention in which the accelerometer which forms a portion of the oscillator circuit includes a pair of vibrating beams, electrically isolated from one another. FIGS. 4 and 5 represent an alternate embodiment of the invention which utilizes an accelerometer having four vibrating beams. FIGS. 6 and 7 illustrate yet another embodiment of the invention which utilizes an accelerometer with a pair of vibrating beams formed with multiple electrically isolated conducting paths per beam.

Referring to FIG. 2, the accelerometer, generally identified with the reference numeral 40, includes an outer casing 42 and a proof mass or pendulum 44. In order to enable the pendulum 44 to rotate with respect to the outer casing 42, the proof mass 44 is connected to the outer casing 42 by way of a pair of flexures 46, which define a hinge axis HA as shown. A double-ended tuning fork (DETF) 48 is connected between the pendulum 44 and the outer casing 42 in a direction generally perpendicular to the hinge axis HA defining a sensitive axis SA. A strut 50 connects an end of the proof mass 44 opposite the flexures 46 to the outer casing 42.

In accordance with the present invention, the DETF 48 includes two beams 52 and 54 disposed parallel to one another and spaced apart by a predetermined gap 56. In contradistinction to known DETFs, the vibrating beams 52 and 54 are not electrically connected together at either end, thus defining a two-port device, providing electrical isolation of the beams 52, 54 and, consequently, separate conducting paths relative for the drive circuit and the pick-off circuit. By providing separate conducting paths, variances in the resistances of the conducting paths have little effect on the performance of the oscillator.

In order to provide mechanical coupling between the beams 52 and 54 such that the two beams 52 and 54 form a mechanical system with two degrees of freedom, extensions 58 are formed on both ends of each of the beams 52 and 54. Exemplary proportions found to provide acceptable mechanical coupling between the two beams 52 and 54 include forming the gap 56 between the vibrating beams 52 and 54 to be about the same width as the width of each of the beams 52 and 54. In addition, the extensions 58 may be formed with a width about four times the width of the beams 52 and 54. The length of the extensions 58 may be formed to be about one-tenth the length of the vibrating beams 52, 54. Such a configuration provides sufficient mechanical coupling between the beams 52 and 54 while enabling the beams 52, 54 to be electrically isolated as discussed above. However, other proportions may provide acceptable coupling as well.

Conducting paths 60 and 62 are formed relative to each of the beams 52 and 54 as shown in FIG. 2. These conducting paths 60 and 62 are formed with conductive traces, such as gold. These conductive traces are deposited onto the vibrating beams 52 and 54 including the extensions 58 along the pendulum 44, strut 50 and casing 42, as shown, and connected to the electrodes or wire pads 61, 63, 64 and 66. The electrodes 61 and 63 allow the conducting path 60 to be connected to an external circuit, while the electrodes 64 and 66 enable the conducting path 62 to be connected to an external circuit.

With such a configuration, one or the other of the beams 52, 54 can be used for excitation while the other of the beams 52, 54 can be used for the pick-off voltage. By providing separate conducting paths for the drive circuit and the pick-off circuit, variations of the resistance of the total conducting path resulting from manufacturing tolerances and temperature changes have little effect the performance of the resulting oscillator.

An oscillator circuit in accordance with the present invention is illustrated in FIG. 3. In particular, as illustrated, the beam 52 is used for the pick-off circuit, while the beam 54 is used for the drive circuit. As discussed above, vibration of the beam 52 in a magnetic field having flux lines generally perpendicular to the plane of the DETF causes a pickoff voltage to be generated between the ends of the vibrating beam 52. As such, one end of the vibrating beam 52 and, in particular, the electrode 63, is connected to ground by way of an electrical conductor 68. The other end of the vibrating beam 52 is connected to the electrode 61 which, in turn, is connected to an amplifier 70 by way of an electrical conductor 72. The output of the amplifier 70, in turn, is applied to an amplitude limiter 74 by way of an electrical conductor 76. The output of the amplitude limiter 74, in turn, is connected to the electrode 64 and, in turn, to one end of the vibrating beam 54 by way of an electrical conductor 78 to provide a drive current to the system. The other end of the vibrating beam 54, in turn, is connected to ground by way of the electrical conductor 80 connected to the electrode 66.

The output voltage from the limiter 74 forces a drive current through the vibrating beam 54. This drive current forces the beam 54 to oscillate. As mentioned above, since the beams 52 and 54 have been configured to provide sufficient mechanical coupling therebetween, the drive current through the beam 54 also results in vibration of the beam 52. The vibration of the beam 52 within the magnetic field having flux lines generally perpendicular to the plane of the DETF 48, in turn, generates a pickoff voltage which, as discussed above, is fed back to the amplifier 70 and the amplitude limiter 74 forming a positive feedback loop to form an oscillator. By providing separate conducting paths between the beams 52 and 54, variations in the resistances of the conducting paths have little effect on the operation of the oscillator.

In an at rest position, in response to an excitation current, the vibrating beams 52 and 54 vibrate at a resonant frequency. Any forces applied along the sensitive axis SA cause the vibrating beams 52, 54 to go into either tension or compression which, in turn, changes the resonant frequency of vibration of the vibrating beams 52 and 54. This change in resonant frequency provides an indication of the force applied along the sensitive axis SA.

FIG. 4 illustrates an alternate embodiment of the invention which includes a DETF 100 that includes four vibrating beams 102, 104, 106 and 108. Similar to the embodiment illustrated in FIG. 2, the double-ended tuning fork 100 is connected between the pendulum 44 and the outer casing 42. The outer pair of vibrating beams 102 and 108 are electrically connected together by a conducting member 110. Similarly, the inner pair of vibrating beams 104 and 106 is connected together by a conducting member 112. The free ends of each of the vibrating beams 102, 104, 106 and 108 are connected to electrodes 114, 116, 118 and 120. Such a configuration provides separate conducting paths between the vibrating beams used for the drive circuit and the vibrating beams used for the pick-off voltage. In particular, a first conducting path is formed between the outer pair of beams 102 and 108, while a second conducting path is provided between the inner pair of tines 104 and 106.

Mechanical coupling between the beams 102 and 104 and between beams 106 and 108 are provided by cross members 122 and 124. More particularly, the cross member 122 is connected between the tine 102 and 104 to cause these beams 102, 104 to vibrate together. Similarly, the cross member 124 is connected between the beams 106 and 108 to cause the beams 106 and 108 to vibrate together. Since the cross member 122 is connected between the beams 102 and 104 and the cross member 124 is connected between the beams 106 and 108, all four beams 102, 104, 106 and 108 are mechanically coupled together forming a two degree of freedom mechanical system.

FIG. 5 represents an oscillator. In particular, the outer pair of vibrating beams 102, 108 are used for the drive circuit, while the inner pair of vibrating beams 104 and 106 are used for the pick-off circuit. Referring first to the drive circuit, the electrode 120 is connected to ground by way of an electrical conductor 126. The other inner vibrating beam 104 is connected to an amplifier 127 by way of an electrical conductor 128 connected to the electrode 116. The output of the amplifier 127 is, in turn, connected to an amplitude limiter 130 by way of an electrical conductor 132. The output of the amplitude limiter 130, in turn, is used to provide the drive current of the outer pair of vibrating beams 102, 108. In particular, the output of the amplitude limiter 130 is connected to the electrode 118 by way of an electrical conductor 133. This forces a drive current up the outer beam 108 and down the outer beam 102 to ground. Drive current is then connected to ground by way of the electrical conductor 134. The magnetic field having flux lines in a direction generally perpendicular to the plane of the DETF, interacts with the drive current in the outer beams 102 and 108 causes these beams 102, 108 to vibrate. Due to the mechanical coupling of the inner pair of beams 104 and 106 relative to the outer pair of beams 102 and 108, a voltage is generated across the inner pair of beams 104 and 106. This voltage is generated across the electrodes 116 and 120. As mentioned above, this voltage is then applied to the amplifier 127 by way of a positive feedback loop in order to form an oscillator.

The operation of the oscillator illustrated in FIG. 5 is similar to the oscillator illustrated in FIG. 3. In particular, in response to an excitation or drive current, the beams 102, 104, 106 and 108 are forced to vibrate at a resonant frequency while the proof mass or pendulum 44 is at rest. Any forces applied along the sensitive axis SA causes the vibrating beams 102, 104, 106 and 108 to go into either tension or compression which, in turn, causes a variation in the resonant frequency at which the beams 102, 104, 106 and 108 vibrate. This difference in the resonant frequency is thus used as a measure of the force applied along the sensitive axis SA. This frequency can be measured at the output of the amplifier 127 along the line 134 by any conventional frequency measuring circuitry which is well known in the art.

FIGS. 6 and 7 illustrate another alternate embodiment of the invention which includes a DETF 133 formed with a pair of vibrating beams 134 and 136. Similar to the embodiments illustrated in FIGS. 2 and 4, the DETF 133 is connected between the pendulum 44 and the outer casing 42. In this embodiment, two electrically isolated conducting paths are formed on each of the vibrating beams 134 and 136. In particular, the beam 134 includes two electrically isolated conducting paths; an outer path 138 and an inner path 140. Similarly, the beam 136 is formed with two electrically isolated conducting paths; an inner path 142 and an outer path 144. The conducting paths may be formed by, for example, deposition of conducting material, such as gold, on the vibrating beam 134 and 136 and appropriate etching to form the two conducting paths per beam.

In order to form separate circuits for the drive voltage and the pickoff voltage, the outer conducting paths 138 and 144 are connected together at one end and connected to electrodes formed from wire bond pads 146 and 148, respectively, on the free ends, defining an electrically isolated drive circuit. Similarly, the inner conducting paths 140 and 142 may be connected together at one end and connected to electrodes 150 and 152, respectively, on the free ends, defining an electrically isolated pickoff circuit.

FIG. 7 illustrates an oscillator which incorporates the accelerometer illustrated in FIG. 6. In this embodiment, vibratory motion of the beams 136 and 138 in the magnetic field generates a pickoff voltage signal at the electrodes 150 and 152. This pickoff voltage is applied to an amplifier 154 by way of an electrical conductor 156. The output signal from the amplifier 154 is applied to a limiter 158 by way of an electrical conductor 160. Since the output of the limiter 158 is used to provide the drive current to the drive circuit, the output of the limiter 158 is connected to the electrode 148 by way of an electrical conductor 162. The other electrode 146 for the drive circuit is connected to ground by way of an electrical conductor 164. In addition, the electrode 150 is also connected to ground by way of the electrical conductor 166.

As mentioned above, any force or acceleration applied along the sensitive axis SA will result in a change in frequency of the pickoff voltage. Thus, the output of the amplifier 154 is applied to a conventional frequency measuring circuit (not shown) by way of the electrical conductor 165.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A vibrating beam accelerometer, comprising:
   a proof mass;
   a casing;
   a plurality of flexures for connecting the proof mass to said casing defining a hinge axis HA; and
   a plurality of vibrating beams defining opposing ends; said vibrating beams connected between said proof mass and said casing, two or more of said plurality of vibrating beams formed with separate and isolated electrical conducting paths, each one of said electrical conducting paths electrically connected to a pair of wire bond pads forming a port for enabling each one of said electrical conducting paths to be directly connected to a drive circuit and a pick off circuit.

2. A vibrating beam accelerometer as recited in claim 1, wherein said plurality of beams is two.

3. A vibrating beam accelerometer as recited in claim 1, wherein said plurality of vibrating beams are spaced apart and electrically isolated from one another.

4. A vibrating beam accelerometer as recited in claim 2, wherein said wire bond pads are carried by said casing on opposing sides of said hinge axis.

5. A vibrating beam accelerometer as recited in claim 1, further including means connected to said electrical ports to form an oscillator.

6. A vibrating beam accelerometer, comprising:
   a proof mass;
   a casing;
   a plurality of flexures for connecting the proof mass to said casing defining a hinge axis HA; and
   a plurality of vibrating beams connected between said proof mass and said casing, said plurality of vibrating beams formed with separate electrical conducting paths forming a plurality of ports, wherein said plurality of beams is four defining an inner pair of beams and an outer pair of beams.

7. A vibrating beam accelerometer as recited in claim 6, wherein one of said inner and outer pair of beams are electrically connected together at one end and each of said opposing ends of said beams is connected to a wire bond pad defining a first port.

8. A vibrating beam accelerometer as recited in claim 7, wherein the other of said inner and outer pairs of beams are electrically connected together at one end and each of said opposing ends of said beams is connected to a wire bond pad defining a second port.

9. A vibrating beam accelerometer as recited in claim 8, wherein said first port and said second port are disposed on one side of the hinge axis.

10. An oscillator comprising:
    a vibrating beam accelerometer having a plurality of vibrating beams defining opposing ends, said beams being electrically connected to a plurality of wire bond pads adapted to be directly connected to a predetermined external electrical circuit;
    means connected to said plurality of wire bond pads for forming an oscillator; and
    means for minimizing the effect on the performance of the oscillator resulting from temperature changes.

11. An oscillator as recited in claim 10, wherein said minimizing means includes means for providing a plurality of electrical paths relative to said vibrating beams.

12. An oscillator as recited in claim 10, wherein said plurality of beams is two, each of said plurality of beams being electrically connected on opposing ends to a wire bond pad defining a first pair of wire bond pads and a second pair of wire bond pads, said first pair of wire bond pads disposed adjacent one end of said vibrating beams and said second pair of wire bond pads being disposed adjacent an opposing end of said beams.

13. An oscillator as recited in claim 10, wherein said plurality of beams is four defining an inner pair of beams and an outer pair of beams, said inner and outer pairs of beams each being electrically connected together adjacent one end of said beams while opposing ends of said beams are electrically connected to four wire bond pads.

14. A vibrating beam accelerometer, comprising:
    a proof mass;
    a casing;
    a plurality of flexures for connecting the proof mass to said casing defining a hinge axis HA; and
    a plurality of vibrating beams connected between said proof mass and said casing, each of said plurality of vibrating beams formed with two separate and isolated electrical conducting paths connected to a plurality of wire bond pads adapted to be directly connected to a predetermined external electrical circuit.

* * * * *

REEXAMINATION CERTIFICATE (3594th)
United States Patent [19]
Woodruff et al.

[11] B1 5,501,103
[45] Certificate Issued Aug. 4, 1998

[54] TWO-PORT ELECTROMAGNETIC DRIVE FOR A DOUBLE-ENDED TUNING FORK

[75] Inventors: James R. Woodruff, Redmond; Michael J. Robinson, Mukilteo, both of Wash.

[73] Assignee: AlliedSignal, Inc., Morristown, N.J.

Reexamination Request:
No. 90/004,489, Dec. 17, 1996

Reexamination Certificate for:
Patent No.: 5,501,103
Issued: Mar. 26, 1996
Appl. No.: 198,228
Filed: Feb. 15, 1994

[51] Int. Cl.$^6$ .................................................. G01P 15/08
[52] U.S. Cl. .............................. 73/514.29; 73/862.59
[58] Field of Search ......................... 73/862.59, 704, 73/DIG. 1, 778, 651, 514.15, 514.29, 514.12, 504.16; 331/65, 156, 163

[56] References Cited

U.S. PATENT DOCUMENTS

| | | | |
|---|---|---|---|
| 4,535,638 | 8/1985 | EerNisse et al. | 73/862.59 |
| 4,851,080 | 7/1989 | Howe et al. | 73/517 AV |
| 4,912,990 | 4/1990 | Norling | 73/862.59 |
| 5,142,913 | 9/1992 | Delatoree | 73/704 |
| 5,233,874 | 8/1993 | Putty et al. | 73/517 AV |

FOREIGN PATENT DOCUMENTS

| | | |
|---|---|---|
| 0 456 029 | 11/1991 | European Pat. Off. |
| 28 45 008 | 4/1980 | Germany . |
| 2 261 731 | 5/1993 | United Kingdom . |
| 91 13328 | 9/1991 | WIPO . |

OTHER PUBLICATIONS

Publication: Sensors & Actuators, entitled: A Thermally-Excited Silicon Accelerometer, May 3, 1989, vol. 17, No. 1-2, pp. 241-245, D.W. Satchell and J.C. Greenwood (STC Technology Ltd., London Road, Harlow, Essex CM17 CNA (U.K.).

*Primary Examiner*—Christine K. Oda

[57] ABSTRACT

An electromagnetically-excited silicon micromachined vibrating beam accelerometer includes a proof mass or pendulum attached to an outer casing by way of a pair of flexures defining a hinge axis HA. A double-ended tuning fork (DETF) is connected between the proof mass and the casing along an axis generally perpendicular to the hinge axis (HA) defining a sensitive axis SA such that forces applied along the hinge axis HA will cause the DETF to go into either compression or tension. Electromagnetic excitation causes the vibrating beams to vibrate at a resonant frequency when the proof mass is at rest. In response to a force along the sensitive axis SA, the vibrating beams go into either tension or compression resulting in a change in the resonant frequency which, in turn, is used as a measure of the force. The excitation includes a magnetic field B, applied in a direction generally perpendicular to the plane of the DETF and perpendicular to the sensitive axis SA. In order to eliminate the effects of variations in the resistance path of the vibrating beams due to either manufacturing tolerances and temperature, the DETF in accordance with the present invention is formed as a dual-port device with separate conducting paths for the drive circuit and the pick-off circuit. By providing separate conducting paths, the effects of changes in the resistance path of the drive circuit have little effect on the overall performance of the oscillator. Since the beams are separated, the DETFs are configured to provide sufficient mechanical coupling of the beams forming the DETF.

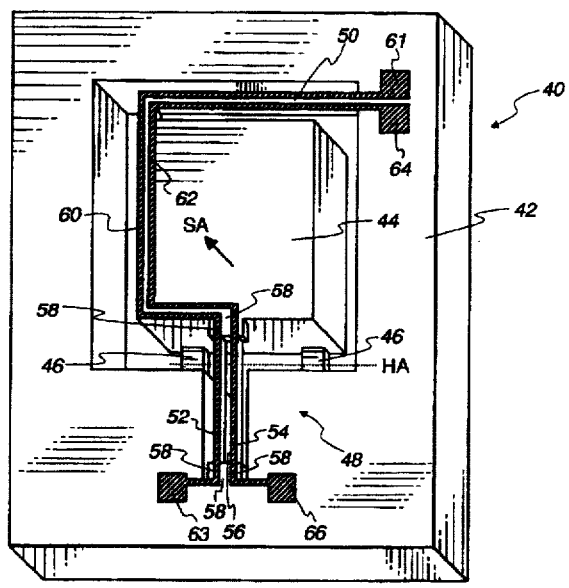

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 14 are confirmed.

\* \* \* \* \*